United States Patent [19]
van der Meer

[11] Patent Number: 5,134,196
[45] Date of Patent: Jul. 28, 1992

[54] POLYMER MIXTURE COMPRISING POLYPHENYLENE ETHER AND POLYAMIDE

[75] Inventor: Roelof van der Meer, Je Halsteren, Netherlands

[73] Assignee: General Electric Co., Selkirk, N.Y.

[21] Appl. No.: 561,050

[22] Filed: Aug. 1, 1990

Related U.S. Application Data

[62] Division of Ser. No. 211,961, Jun. 27, 1988, Pat. No. 4,960,825.

[30] Foreign Application Priority Data

Jun. 29, 1987 [NL] Netherlands ............ 8701517

[51] Int. Cl.$^5$ ............ C08L 53/02; C08L 71/12
[52] U.S. Cl. .................... 525/92; 524/275; 524/505; 525/393; 525/397; 525/905
[58] Field of Search ............... 525/92

[56] References Cited

U.S. PATENT DOCUMENTS

| | | | |
|---|---|---|---|
| 4,277,575 | 7/1981 | Haaf et al. | 525/92 |
| 4,772,664 | 9/1988 | Ueda et al. | 525/92 |
| 4,874,810 | 10/1989 | Lee, Jr. et al. | 525/92 |
| 4,960,825 | 10/1990 | vander Meer | 525/92 |

*Primary Examiner*—Jacob Ziegler
*Attorney, Agent, or Firm*—Francis T. Coppa

[57] ABSTRACT

The mechanical properties of polymer mixtures which comprise a polyphenylene ether, a polyamide, and an agent to improve the impact strength can be improved by using as an agent to improve the impact strength a mixture consisting of
a) 10–90 parts by weight of a partially hydrogenated diene-vinylaromatic diblock copolymer and,
b) 90–10 parts by weight of a partially hydrogenated diene-vinylaromatic polyblock copolymer having at least three blocks.

10 Claims, No Drawings

POLYMER MIXTURE COMPRISING POLYPHENYLENE ETHER AND POLYAMIDE

This is a divisional of application Ser. No. 211,961, filed Jun. 27, 1988, now U.S. Pat. No. 4,960,825.

The invention relates to a polymer mixture which comprises a polyphenylene ether, a polyamide and an agent to improve the impact strength.

Polymer mixtures which comprise a polyphenylene ether and a polyamide are known per se. For this purpose, reference may be made, for example, to EP-A 0024 120; EP-A 0046 040 and EP-A 0147 874. These polymers are non-miscible.

In addition to a polyphenylene ether and a polyamide the polymer mixtures meant hereinbefore may comprise an agent to improve the impact strength. As such are mentioned the generally used agents to improve the impact strength of polyamides or polyphenylene ethers, for example, styrene butadiene block copolymers.

EP-A 0024 120 describes polymer mixtures which comprise a polyphenylene ether, a polyamide and a rubber-like polymer. As rubber-like polymers are mentioned inter alia butadiene/styrene copolymers (including random copolymers, block copolymers and graft copolymers).

Polymer mixtures which comprise a polyamide, a polyphenylene ether and an agent to improve the impact strength are disclosed in Applicants' non pre-published Patent Application (U.S. priority 860307, Ser. No. 837,474). As an agent to improve the impact strength these prior art polymer mixtures may comprise a partially hydrogenated diblock copolymer of styrene and ethylene/propylene.

It has been found in practice that the prior art polymer mixtures mentioned hereinbefore must carefully be compounded. In order to obtain products having optimum properties, the said known polymer mixtures must be compounded in the extruder under less heavy conditions, for example, comparatively low shear rate, than is generally usual for similar mixtures.

The invention is based on the discovery that by using a mixture of various block copolymers as an agent to improve the impact strength, polymer mixtures are obtained which can also be extruded under heavier conditions.

The polymer mixture according to the invention is characterised in that the polymer mixture comprises as an agent to improve the impact strength a mixture consisting of at least
  a) 10–90 parts by weight of a partially hydrogenated diene-vinylaromatic diblock copolymer and
  b) 90–10 parts by weight of a partially hydrogenated diene-vinylaromatic polyblock copolymer having at least three blocks, the parts by weight being indicated per 100 parts by weight of a) plus b).

The polymers mixtures according to the invention preferably comprise 5–94% by weight of one or more polyphenylene ethers, 5–94% by weight of one or more polyamides and 1–35% by weight of agent to improve the impact strength. The quantity of polyamide is preferably chosen to be so that the polyamide constitutes a continuous phase in which the polyphenylene ether is present in a dispersed phase. For that purpose the quantity by weight of polyamide preferably is at least 30% by weight.

It is to be preferred to use in the polymer mixtures according to the invention a quantity by weight of the diblock copolymer a) which is larger than or equal to the quantity by weight of the polyblock copolymer b) used.

The polymer mixture according to the invention preferably comprises a partially hydrogenated isoprene-styrene diblock copolymer as the diblock copolymer.

The polymer mixture according to the invention preferably comprises a partially hydrogenated styrene-butadiene-styrene triblock copolymer as the polyblock copolymer.

The use of a mixture of saturated triblock copolymers and saturated diblock copolymers in polymer mixtures which comprise a polyphenylene ether and polystyrene is known from U.S. Pat. No. 4,227,575. It relates here to mixtures of polymers which are fully miscible mutually. According to this prior art, a diblock copolymer is unfit to improve the impact strength of a polyphenylene ether/polystyrene mixture. A diblock copolymer mixed with a triblock copolymer reinforces the activity of the latter (col. 3, lines 25–34).

The polymer mixture according to the invention preferably also comprises an agent to improve the compatibility of the polyphenylene ether and the polyamide.

As an agent to improve the compatibility is preferably used malic acid, citric acid, maleic anhydride, fumaric acid or derivatives thereof or a functionalised polyphenylene ether.

In addition to the constituents mentioned hereinbefore, the polymer mixture according to the invention may comprise one or more of the following constituents: fillers, reinforcing fibres, flame retardants, stabilisers, dyes and/or pigments. The stabilisers generally known for polyamides may be used as stabilisers.

The polymer mixtures according to the invention comprise one or more compounds selected from the following groups of compounds:
  A polyphenylene ether
  B polyamides
  C agent to improve the impact strength.

A. POLYPHENYLENE ETHERS

Polyphenylene ethers are compounds known per se. For this purpose, reference may be made to the U.S. Pat. Nos. 3,306,874; 3,306,875; 3,257,357 and 3,257,358.

Polyphenylene ethers are usually prepared by an oxidative coupling reaction-in the presence of a copper amine complex- of one or more two-fold or three-fold substituted phenols, homopolymers and copolymers, respectively, being obtained. Copper amine complexes derived from primary, secondary and/or tertiary amines may be used. Examples of suitable polyphenylene ethers are:
poly(2,3-dimethyl-6-ethylphenylene-1,4-ether)
poly(2,3,6-trimethylphenylene-1,4-ether)
poly(2-(4'-methylphenyl) phenylene-1,4-ether)
poly(2-bromo-6-phenylphenylene-1,4-ether)
poly(2-methyl-6-phenylphenylene-1,4-ether)
poly(2-phenylphenylene-1,4-ether)
poly(2-chlorophenylene-1,4-ether)
poly(2-methylphenylene-1,4-ether)
poly(2-chloro-6-ethylphenylene-1,4-ether)
poly(2-chloro-6-bromophenylene-1,4-ether)
poly(2,6-di-n-propylphenylene-1,4-ether)
poly(2-methyl-6-isopropylphenylene-1,4 ether)
poly(2-chloro-6-methylphenylene-1,4-ether)
poly(2-methyl-6-ethylphenylene-1,4-ether)
poly(2,6-dibromophenylene-1,4-ether)
poly(2,6-dichlorophenylene-1,4-ether)

poly(2,6-diethylphenylene-1,4-ether)
poly(2,6-dimethylphenylene-1,4-ether)

Copolymers, for example, copolymers derived from two or more phenols as used in the preparation of the homopolymers mentioned hereinbefore, are also suitable. Further suitable are graft copolymers and block copolymers of vinylaromatic compounds, for example, styrene and of polyphenylene ether as described above.

B. POLYAMIDES

Polyamides are used in the polymer mixtures according to the invention. Any thermoplastic polyamides known per se may be used in the polymer mixtures according to the invention. Examples of suitable polyamides are polyamide-4; polyamide-6; polyamide-4,6; polyamide-6,6; polyamide-3,4; polyamide-12; polyamide-11; polyamide-6,10; polyamides prepared from terephthalic acid and 4,4'-diaminodicyclohexyl methane, polyamides prepared from azelaic acid, adipic acid and 2,2-bis-(p-aminocyclohexyl)propane, polyamide's prepared from adipic acid and metaxylylene diamine, polyamides from terephthalic acid and trimethylhexamethylene diamine. Polyamides known per se and having a comparatively high content of amine terminal groups are also suitable.

AGENT TO IMPROVE THE IMPACT STRENGTH

As an agent to improve the impact strength the polymer mixtures according to the invention comprise a mixture which consists of at least:

a) 10–90 parts by weight of a partially hydrogenated diene-vinylaromatic diblock copolymer, and b) 90–10 parts by weight of a partially hydrogenated diene-vinylaromatic polyblock copolymer having at least three blocks.

Partially hydrogenated diene vinylaromatic block copolymers (diblock- and polyblock) are known per se. Partially hydrogenated is to be understood to mean herein that the blocks built up from diene units are hydrogenated for the greater part, while the blocks built up from the vinylaromatic units are not hydrogenated. These block copolymers usually comprise blocks which are derived for the greater part from styrene, as a vinylaromatic unit, and blocks derived from isopropene and/or butadiene. The weight ratio between the diene blocks and the vinylaromatic blocks may be varied within wide limits, for example, between 10:90 and 90:10. The molecular weight of the individual blocks may also be chosen between wide limits.

The above-mentioned partially hydrogenated diblock copolymers are marketed, for example, by Shell Chemicals under the name of Kraton ® GX 1701 and following numbers. The same Company markets partially hydrogenated triblock copolymers under the name of Kraton ® G 1650 and following numbers.

In addition to the constituents mentioned hereinbefore the polymer mixtures according to the invention may comprise an agent to improve the compatibility of the polyphenylene ether and the polyamide. These are to be understood to be agents which facilitate the mixing in the melt of two non-miscible polymers and also improve the bonding between the phases in such systems (see chapter I of "Polymer-Polymer miscibility" Academic Press, 1979). In practice this means that these agents suppress the tendency to delamination of two-phase polymer mixtures.

As an agent to improve the compatibility the polymer mixtures according to the invention may comprise one or more compounds selected from the following groups:

a) liquid diene polymers or epoxy compounds or compounds having in their molecular structure a two-fold or three-fold carbon-to-carbon bond and a carboxylic acid, acid anhydride, acid amide, imido, carboxylic acid ester, amino or hydroxyl group in a quantity from 0.01 to 30 parts by weight per 100 parts by weight of polyamide plus polyphenylene ether, for example, as described in EP-A-0024120 and WO87/00540, b) aliphatic polycarboxylic acids or derivatives thereof of the general formula: $(R_1O)_m R(COOR_2)_n(CONR_3R_4)_s$, wherein R is a saturated hydrocarbon group having 2 to 20 carbon atoms with a linear or branched chain; $R_1$ is a hydrogen atom or an alkyl group, aryl group, acyl group or carbonyldioxy group having 1 to 10 carbon atoms; each $R_2$ independently of each other represents a hydrogen atom or an alkyl group or aryl group having 1 to 20 carbon atoms; each $R_3$ and $R_4$ independently of each other represents a hydrogen atom or an alkyl group or aryl group having 1 to 10 carbon atoms; m is equal to 1 and (n+s) is larger than or equal to 2 and n and s each are larger than or equal to zero; and wherein ($OR_1$) is in an alpha position or beta position with respect to a carbonyl group and in which at least two carbonyl groups are separated by 2 to 6 carbon atoms, in a quantity of 0.05 to 5 parts by weight per 100 parts by weight of polyamide plus polyphenylene ether, as described, for example, in WO-A-85/05372, c) a silane compound having in its molecular structure both a) at least one silicon atom which via an oxygen bridge is bonded to a carbon atom and b) at least one ethenic carbon-to-carbon double bond or a carbon-to-carbon three-fold bond and/or a functional group selected from an amine group and a mercapto group, in which the functional group is not directly bonded to the silicon atom, in a quantity of 0.05 to 4 parts by weight of polyamide plus polyphenylene ether, for example, as described in EP-A-0182163, d) a functionalised polyphenylene ether consisting of the reaction product of (a) a polyphenylene ether and (b) a compound of the general formula (i)-Z-(ii), in which (i) is at least a group of the formula [X—C(O)] wherein X=F, Cl, Br, I, OH, —OR, or —O—C(O)—R wherein R=H, alkyl or aryl, in which (ii) is at least a carboxylic acid, acid anhydride, acid amide, imido, carboxylic acid ester, amino or hydroxyl group and in which the groups (i) and (ii) are covalently bonded together via a bridge Z and in which Z is a bivalent hydrocarbon radical, for example, as described in e) an oxidised polyolefin wax, optionally in combination with an organic phosphite, in a quantity from 0.01 to 10 parts by weight per 100 parts by weight of polyamide plus polyphenylene ether, for example, as described in EP-A-0164767, f) a copolymer with units of a vinylaromatic compound and of an alpha-beta unsaturated dicarboxylic acid or dicarboxylic acid anhydride or a copolymer built up from units of a vinylaromatic compound and of an imide compound of an alpha-beta unsaturated dicarboxylic acid, in a quantity from 0.5 to 100 parts by weight per 100 parts by weight of polyamide plus polyphenylene ether, for example, as described in EP-A-0046040 and EP-A-0147874, g) the reaction product of a) 1,2-substituted olefinic compound with carboxyl group or acid anhydride group, b) a polyphenylene ether and c) a radical initiator, in a quantity from 0.5 to 150 parts by weight per 100 parts by weight of polyamide plus polyphenylene ether, for example, as described in JP-A-59(1984)-66452, h) a copolymer built up from vinylaromatic monomers derived from benzene, and of (meth)acrylic acid or alkyl esters thereof, for example, as described in EP-A-0184 151. The vinylaromatic monomer may be replaced partly by (meth)acrylonitrile.

The agents referred to sub d) and g) for improving the compatibility may replace the polyphenylene ether in the polymer mixtures according to the invention entirely or partly.

The polymer mixtures according to the invention may be prepared according to any method known for the preparation of polymer mixtures. The polymer mixtures according to the invention are preferably prepared by melt extrusion. In preparing the polymer mixtures according to the invention by means of melt extrusion it is sometimes preferred first to precompound the polyphenylene ether with the agent to improve the impact strength. It is also possible to precompound the polyphenylene ether with the agent to improve the impact strength and with the agent to improve the compatibility. It is also possible to prepare the polymer mixtures in an extruder having several filling apertures. The greater part of the constituents may then, for example, be applied in a filling aperture which is situated as far as possible from the outlet aperture (i.e. throat), while a part of the constituents, for example, a part or the total quantity of polyamide to be used is applied via a filling aperture which is situated nearer to the outlet aperture of the extruder.

The invention will now be described in greater detail with reference to the ensuing specific examples:

EXAMPLE I AND COMPARATIVE EXAMPLE A

Two different polymer mixtures were prepared from 44 parts by weight of poly (2,6-dimethylphenylene-1,4-ether) having an intrinsic viscosity of approximately 49 ml/g measured at 25° C. in chloroform, 41 parts by weight of predried polyamide-6,6 (having a number average molecular weight Mn of 20,000 and a viscosity index measured according to ISO R 307-0.5 g of polyamide dissolved in 100 g of 90% formic acid at 25° C.- of 135 ml/g), 15 parts by weight of an agent to improve the impact strength, 0.7 parts by weight of citric acid-1-hydrate, 0.4 parts by weight of stabilisers and 0.1 parts by weight of soot. The agent used in example I according to the invention to improve the impact strength was a mixture of equal parts by weight of a partially hydrogenated styrene-butadiene-styrene triblock copolymer and a partially hydrogenated styrene-isoprene diblock copolymer and a partially hydrogenated styrene-isoprene diblock copolymer. In comparative example A only the just-mentioned diblock copolymer was used.

The said constituents were compounded in a Werner Pfleiderer extruder. The temperature in the first zone was adjusted at 220° C., in the second zone and subsequent zones at 285° C. Each sample was compounded at three different speeds, namely at 200, 300 and at 400 revolutions. A lower speed results in a lower shear rate (in otherwise equal circumstances). All the above-mentioned constituents, with the exception of 31 parts by weight out of the 41 parts by weight of polyamide-6,6, were applied to the throat of the extruder. The said 31 parts by weight of polyamide-6,6 were applied approximately halfway to the extruder. The resulting extrudate was chopped up.

Standardized test rods for measuring the impact strength according to Izod (ASTM D 256) were manufactured from the resulting extrudates by injection-moulding. The impact strength was measured at room temperature and at −30° C. The results obtained are recorded in Table I hereinafter.

TABLE 1

|  | Example I rpm | | | Comparative Example A rpm | | |
| --- | --- | --- | --- | --- | --- | --- |
|  | 200 | 300 | 400 | 200 | 300 | 400 |
| Impact strength according to Izod (J/m) at room temperature | 460 | 560 | 295 | 365 | 115 | 185 |
| minus 30° C. | 170 | 205 | 190 | 165 | 75 | 115 |

It may be seen from the results of Table 1 that the notch impact value of the test rods of Example I according to the invention at room temperature and at −30° C. is influenced less by the extrusion conditions used than of the test rods according to comparative example A. It is also striking that under all the compounding conditions used the impact strength of the test rods according to the invention at −30° C. is better than the best value obtained in the test rods according to comparative example A. This result was by no means to be expected.

EXAMPLE II, COMPARATIVE EXAMPLE B

Three differently composed polymer mixtures according to the invention (example II) and for comparison a fourth polymer mixture (comparative example B) were prepared starting from 21.5 parts by weight of the same polyphenylene ether as used in example I, 21.5 parts by weight of the reaction product of a similar polyphenylene ether and trimellitic acid anhydride chloride, 45 parts by weight of the same polyamide-6,6, as used in example I, 0.7 parts by weight of stabilisers and further auxiliary substances and 0.5 parts by weight of TiO$_2$. In comparative example B, 12 parts by weight of partially hydrogenated butadiene-styrene-butadiene triblock copolymer were used in addition, as used in Example I. In example II, mixtures of the same triblock copolymer were mixed with a partially hydrogenated styrene-isoprene diblock copolymer (as in example I). The total quantity of block copolymers was always 12 parts by weight. The quantity of diblock copolymer and triblock copolymer is recorded in Table 2.

Extrusion was carried out in the same manner as in example I in which, however, only one speed (300 rpm) was used. 35 Parts by weight of polyamide-6,6 were fed into the extruder approximately halfway, all other constituents being fed into the throat of the extruder.

Test rods were injection moulded from the resulting samples. The Izod impact strength was determined. The results are recorded in Table 2.

TABLE 2

|  | Example II | | | Comparative example B |
| --- | --- | --- | --- | --- |
| Quantity of block copolymer (parts by weight) |  |  |  |  |
| diblock | 6 | 3 | 9 | 12 |
| triblock | 6 | 9 | 3 | — |
| Impact strength according to Izod | 439 | 371 | 506 | 357 |

TABLE 2-continued

|  | Example II | Comparative example B |
|---|---|---|
| (J/m) at room temperature | | |

It may be seen from Table 2 that a better impact strength is always obtained when a mixture of a diblock copolymer and a polyblock copolymer is used. In addition it has been found that a further improvement is obtained when the quantity of diblock copolymer is larger than or equal to the quantity of triblock copolymer. On the basis of the results recorded in U.S. Pat. No. 4,277,575 the reverse would be expected.

I claim:

1. A polymer mixture, comprising:
   a) polyphenylene ether resin;
   b) polyamide resin;
   c) an agent to improve the impact strength of the polymer mixture, said agent comprising:
      i) 10-90 parts by weight of a partially hydrogenated vinylaromatic-diene-vinylaromatic diblock copolymer; and
      ii) 90-10 parts by weight of a partially hydrogenated diene-vinylaromatic polyblock copolymer having at least three blocks;
      wherein the parts of components (i) and (ii) are based on 100 parts of their total weight; and
   d) an agent to improve the compatibility of the polyphenylene ether and the polyamide.

2. The polymer mixture of claim 1, comprising 5-94% by weight of one or more polyphenylene ethers, 5-94% by weight of one or more polyamides, and 1-35% by weight of the impact strength agent.

3. The polymer mixture of claim 1, wherein the amount of diblock copolymer component (i) is greater than or equal to the amount of polyblock copolymer (ii).

4. The polymer mixture of claim 1, wherein the diblock copolymer of component (i) is a partially hydrogenated isoprene-styrene diblock copolymer.

5. The polymer mixture of claim 1, wherein the polyblock copolymer of component (ii) is a partially hydrogenated styrene-butadiene-styrene triblock copolymer or a partially hydrogenated styrene-isoprene-styrene triblock copolymer.

6. The polymer mixture of claim 1, wherein the compatibilizing agent of component (d) is selected from the group consisting of malic acid; citric acid; maleic anhydride; fumaric acid; derivatives of any of the foregoing; and functionalized polyphenylene ethers.

7. The polymer mixture of claim 1, further comprising at least one constituent selected from the group consisting of fillers, reinforcing fibers, flame-retardants, stabilizers; dyes, and pigments.

8. The polymer mixture of claim 1, wherein the polyphenylene ether resin is selected from the group consisting of poly(2,3,6-trimethylphenylene-1,4-ether); poly(2,6-dimethylphenylene-1,4-ether); and copolymers derived from at least two phenolic compounds.

9. A polymer mixture, comprising:
   a) 5-94% by weight poly(2,6-dimethylphenylene-1,4-ether);
   b) 5-94% by weight of a polyamide selected from the group consisting of polyamide-6; polyamide-4,6; polyamide-6,6; polyamide-11; polyamide-12; and polyamide-6,10;
   c) an agent to improve the impact strength of the polymer mixture, said agent comprising:
      i) 10-90 parts by weight of a partially hydrogenated isoprene-styrene diblock copolymer; and
      ii) 90-10 parts by weight of a partially hydrogenated styrene-isoprene-styrene triblock copolymer or a partially hydrogenated styrene-butadiene-styrene triblock copolymer;
      wherein the parts of components (i) and (ii) are based on 100 parts of their total weight; and
   d) a compatibilizing agent for components (a) and (b).

10. The composition of claim 9, wherein the compatibilizing agent is selected from the group consisting of malic acid; citric acid; maleic anhydride; fumaric acid; derivatives of any of the foregoing; and functionalized polyphenylene ethers.

* * * * *